US008641245B2

(12) United States Patent
Wu

(10) Patent No.: US 8,641,245 B2

(45) Date of Patent: Feb. 4, 2014

(54) RADIATING DEVICE FOR LAMP AND LED LAMP

(75) Inventor: Chun-wei Wu, Guang Zhou Science (CN)

(73) Assignee: Nanker (Guangzhou) Semiconductor Manufacturing Corp., Guangdong (CN)

( * ) Notice: Subject to any disclaimer, the term of this patent is extended or adjusted under 35 U.S.C. 154(b) by 174 days.

(21) Appl. No.: 13/060,749

(22) PCT Filed: Aug. 21, 2009

(86) PCT No.: PCT/CN2009/073428

§ 371 (c)(1),
(2), (4) Date: Feb. 25, 2011

(87) PCT Pub. No.: WO2010/022636

PCT Pub. Date: Mar. 4, 2010

(65) Prior Publication Data

US 2011/0156587 A1 Jun. 30, 2011

(30) Foreign Application Priority Data

Aug. 25, 2008 (CN) .......................... 2008 1 0030361
Oct. 27, 2008 (CN) .......................... 2008 1 0218683

(51) Int. Cl.

| | |
|---|---|
| ***B60Q 1/06*** | (2006.01) |
| ***F21V 29/00*** | (2006.01) |
| ***F28F 7/00*** | (2006.01) |

(52) U.S. Cl.

USPC ........... 362/373; 362/294; 165/80.3; 165/185

(58) Field of Classification Search

USPC .......... 362/373, 294, 249, 800; 361/688, 704, 361/709, 710; 165/80.3, 80.4

See application file for complete search history.

(56) References Cited

U.S. PATENT DOCUMENTS

| | | | | |
|---|---|---|---|---|
| 4,884,331 | A * | 12/1989 | Hinshaw | 29/558 |
| 5,278,432 | A * | 1/1994 | Ignatius et al. | 257/88 |
| 5,698,866 | A * | 12/1997 | Doiron et al. | 257/99 |
| 6,045,240 | A | 4/2000 | Hochstein | |
| 6,729,383 | B1 * | 5/2004 | Cannell et al. | 165/80.3 |

(Continued)

FOREIGN PATENT DOCUMENTS

| | | |
|---|---|---|
| CN | 200961841 Y | 10/2007 |
| CN | 201074793 Y | 6/2008 |

(Continued)

*Primary Examiner* — Jong-Suk (James) Lee

*Assistant Examiner* — Alexander Garlen

(74) *Attorney, Agent, or Firm* — Alan Kamrath; Kamrath IP Lawfim, P.A.

(57) ABSTRACT

A radiating device for a lamp and an LED lamp including the radiating device are provided. The LED lamp includes an LED light source module (2), a light transmission protective cover (3) and the radiating device for the lamp. The LED light source module (2) includes several LEDs (21) and a radiating circuit substrate (22). The radiating device for the lamp includes a radiating base plate (1). Several radiating rods (11) are arranged at the back side of the radiating base plate (1). The LED light source module (2) is fixedly connected with the radiating base plate (1), and heat is conducted from the LED light source module to the radiating base plate (1) through the radiating circuit substrate (22). The light transmission protective cover (3) is hermetically connected with the radiating base plate (1).

6 Claims, 8 Drawing Sheets

(56) References Cited

U.S. PATENT DOCUMENTS

| | | | | |
|---|---|---|---|---|
| 7,182,488 | B2 * | 2/2007 | Hsu | 362/373 |
| 7,198,386 | B2 * | 4/2007 | Zampini et al. | 362/294 |
| 7,227,750 | B2 * | 6/2007 | Chen et al. | 361/688 |
| 7,246,922 | B2 * | 7/2007 | Hulick et al. | 362/294 |
| 7,255,460 | B2 * | 8/2007 | Lee | 362/294 |
| 7,456,805 | B2 * | 11/2008 | Ouderkirk et al. | 345/32 |
| 2008/0144318 | A1 * | 6/2008 | Kuan | 362/294 |
| 2010/0177519 | A1 * | 7/2010 | Schlitz | 362/294 |

FOREIGN PATENT DOCUMENTS

| | | | |
|---|---|---|---|
| CN | 101373061 | A | 2/2009 |
| CN | 101387390 | A | 3/2009 |
| CN | 201262381 | Y | 6/2009 |

* cited by examiner

RADIATING DEVICE FOR LAMP AND LED LAMP

TECHNICAL FIELD

This invention relates to a kind of lamp heat dissipation apparatus and to an LED lamp comprising said dissipation apparatus.

BACKGROUND OF THE INVENTION

As a kind of new illuminate light source with an outstanding advantage of its energy saving, environmental protection, high shining efficiency, and long life, an LED is widely used in various situations. Presently, a high power LED light source as a lamp could be used as a street lamp, a wall washer lamp and a large lamp. However, a high power LED will produce a lot of heat, which if not dissipated immediately, will damage the LED by high temperature and affect the using life. Therefore, good heat dissipation is needed. FIG. 1 is an existing lamp comprising a heat dissipation substrate 1 with heat dissipation patches 10 on it. Existing lamps normally use heat dissipation patches to dissipate heat, but as the interspaces of the heat dissipation patches array are in parallel if air flows vertically to the heat dissipation patches, the ventilation will not be smooth in the interspaces of the heat dissipation patches, namely the outside air will not make a good effect to the heat dissipation of the lamp.

SUMMARY OF INVENTION

The technical problems of this invention are to overcome the deficiency of existing techniques and to provide a kind of lamp heat dissipation apparatus with good heat dissipation effect.

Besides, this invention also provides a kind of LED lamp with good heat dissipation effect.

The technical project of this lamp heat dissipation apparatus invention is a lamp heat dissipation apparatus comprising a heat dissipation substrate, with the back of the heat dissipation substrate disposed with several heat dissipation rods.

The heat dissipation rods are arranged in an array.

Spacings between each adjacent two heat dissipation rods are the same.

The heat dissipation rods are arranged in a rectangle array, or the heat dissipation rods are arranged in a diamond array.

The thickness of the heat dissipation substrate is 3~18 mm, the diameter of the heat dissipation rods is $\phi 2$~$\phi 8$ mm, a height of the heat dissipation rods is 10~200 mm, and a distance between centers of each two adjacent heat dissipation rods is 5~18 mm.

The technical project of this LED lamp invention is an LED lamp comprising an LED illuminant subassembly and a light transmission protective cover. The LED illuminant subassembly includes several LEDs and a heat dissipation circuit board. The LED lamp includes a lamp heat dissipation apparatus. The lamp heat dissipation apparatus includes a heat dissipation substrate, with the back of the heat dissipation substrate disposed with several heat dissipation rods. The LED illuminant subassembly and the heat dissipation substrate are connected to conduct heat to the heat dissipation substrate via the heat dissipation circuit board. The light transmission protective cover and the heat dissipation substrate are sealably connected.

The LED lamp includes a drive subassembly comprising a constant voltage device and a heat dissipation drive circuit board. The drive subassembly is located in the sealable space formed by the light transmission protective cover and the heat dissipation substrate. The heat dissipation drive circuit board and the heat dissipation substrate are connected to conduct heat.

The LED lamp includes a power protective casing connected to the heat dissipation substrate via a bolt and sealably contained in a groove of a bottom of the heat dissipation substrate. The power protective casing contains a power switch subassembly, with an input power cable of the power switch subassembly going through the power protective casing via a sealable cable block and sealed. The heat dissipation substrate is disposed with a ring-type protuberance with a cable orifice, with an output power cable of the power switch subassembly going through the cable orifice of the ring-type protuberance and connected with the constant voltage device. An output power cable of the power switch subassembly is disposed with a waterproofing sealant.

An outside circumference of the heat dissipation substrate is disposed with a ring-type protuberance, with the ring-type protuberance disposed with a ring groove containing a sealing strip sealably connected with the light transmission protective cover.

The light transmission protective cover is connected with the ring-type protuberance of the heat dissipation substrate via several bolts, with a pressure ring disposed between the several bolts with the light transmission protective cover.

A back of the heat dissipation substrate is disposed with lamps and a lanterns install board.

The LED lamp comprises a glisten cover disposed in the sealable space of the light transmission protective cover and the heat dissipation substrate.

The light transmission protective cover is made of glass or plastic, the heat dissipation substrate is made of aluminium, aluminium alloy, copper or copper alloy, and the heat dissipation rods and the heat dissipation substrate are integral.

The availability effect of this invention is that since the back of the heat dissipation substrate is disposed with several heat dissipation rods, the heat dissipation rods' heat dissipation area is bigger than the traditional's heat dissipation area. The interspaces of the heat dissipation rods crisscross to allow air flow in any direction freely and not blocked in the interspaces of the heat dissipation rods. Namely, outside air will make a good effect to the heat dissipation of the lamp. Since this is quite important to an outdoor street lamp, a wall washer lamp, and a large lamp, this invention's lamp heat dissipation apparatus and LED lamp have a good heat dissipation effect.

DETAILED DESCRIPTION OF THE PREFERRED EMBODIMENTS

Embodiment I

Figure 1:
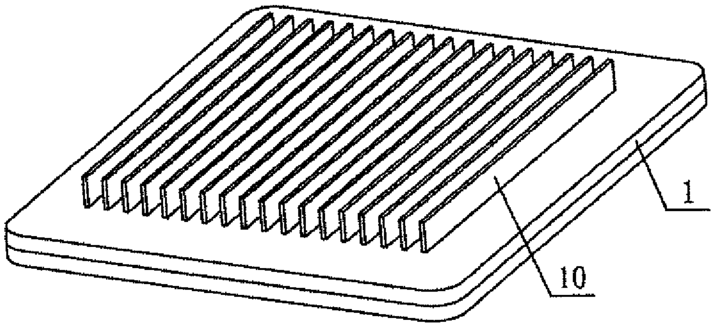
FIG. 1 (Prior Art)
FIG. 1 is the structural view of a kind of existing lamp heat dissipation apparatus.
Figure 2:
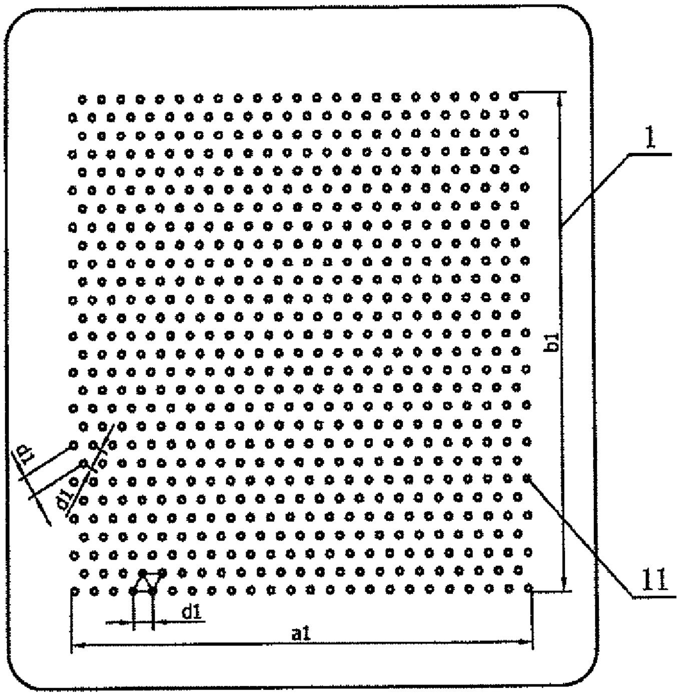
FIG. 2 is the structural view of a lamp heat dissipation apparatus of the preferred embodiment of this invention.
Figure 3:
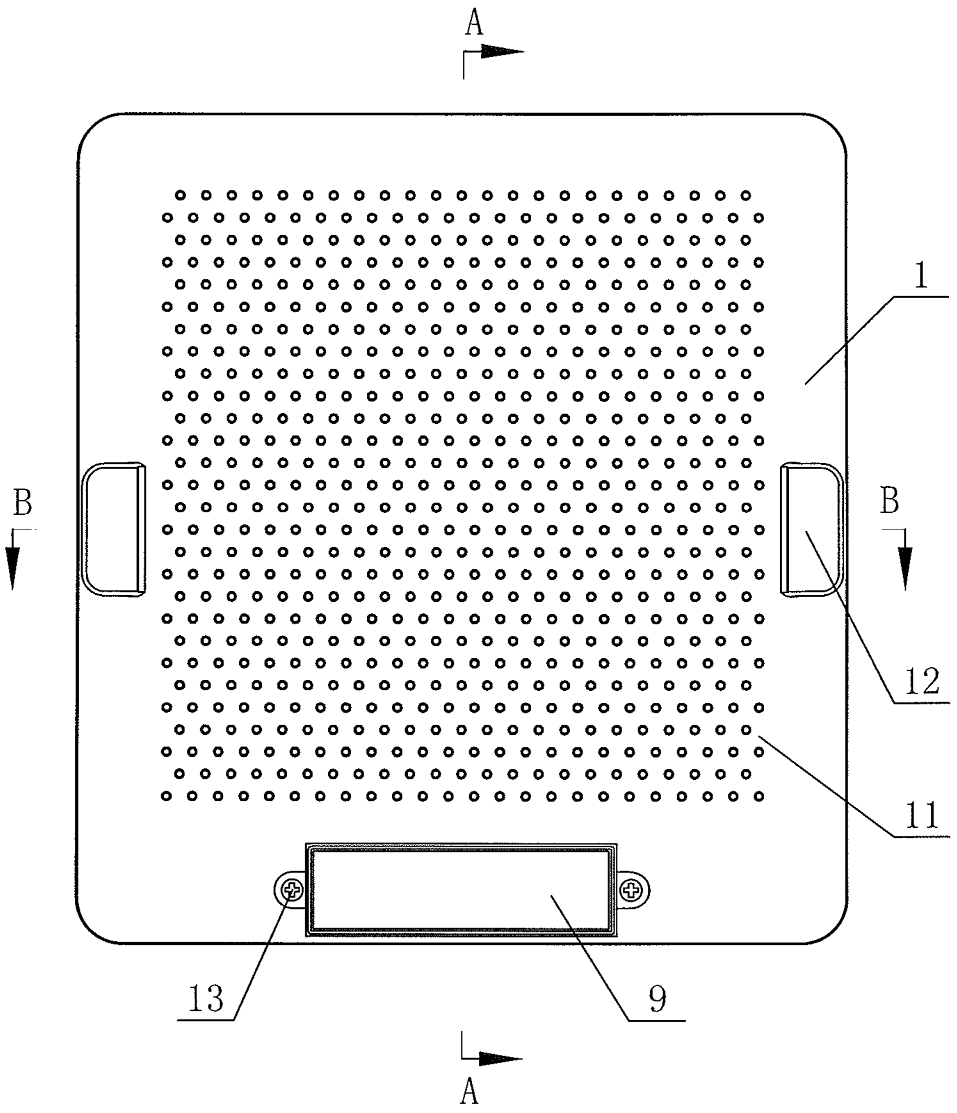
FIG. 3 is the rear structural view of an LED lamp of the preferred embodiment of this invention.
Figure 4:
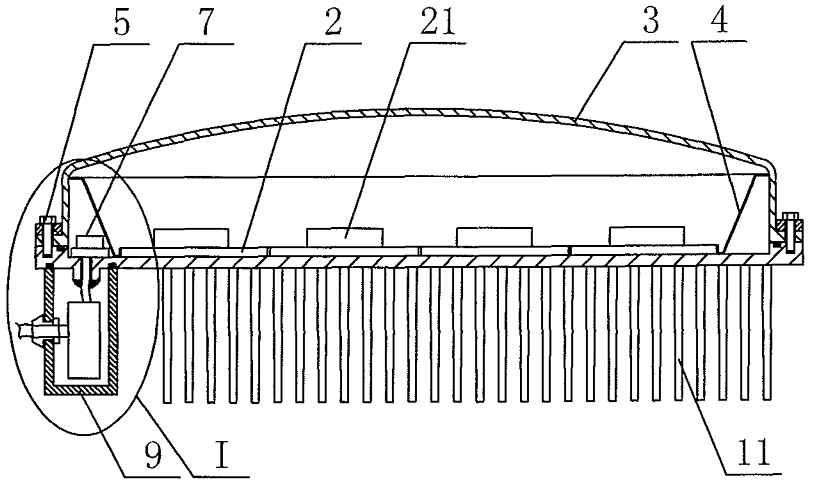
FIG. 4 is the A-A sectional revolved structural view of FIG. 3 showing the LED lamp.
Figure 5:
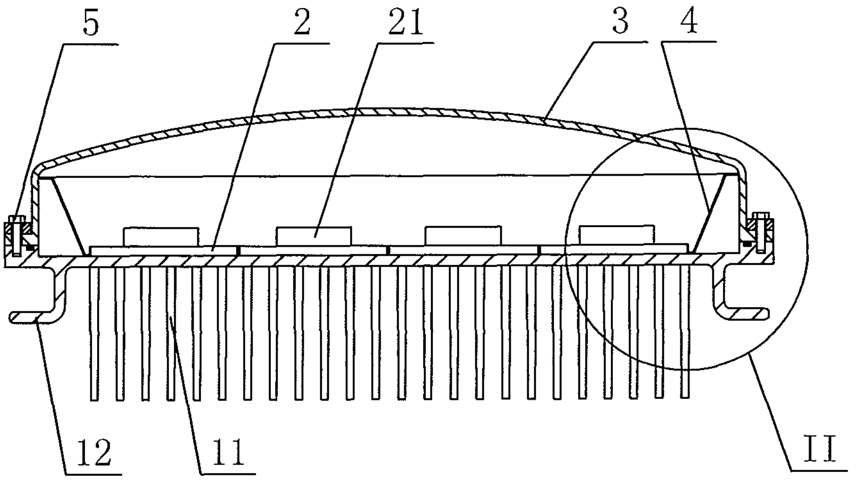
FIG. 5 is the B-B sectional structural view of FIG. 3 showing the LED lamp.
Figure 6:
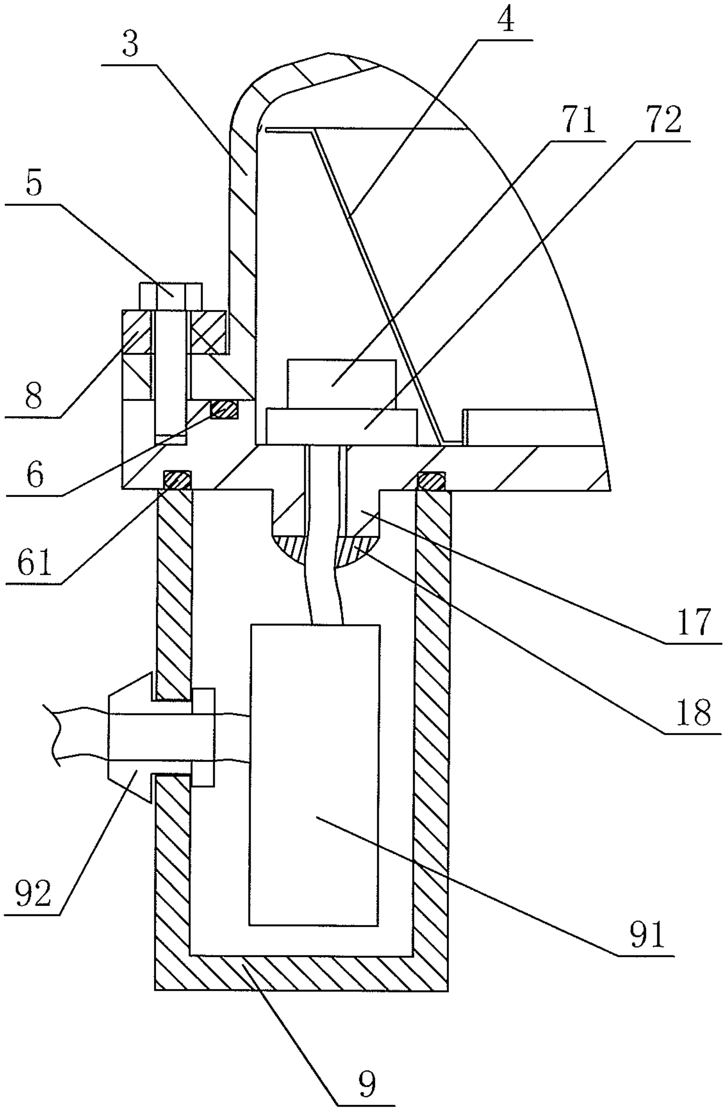
FIG. 6 is the partially magnified structural view of FIG. 4 showing the LED lamp I.
Figure 7:
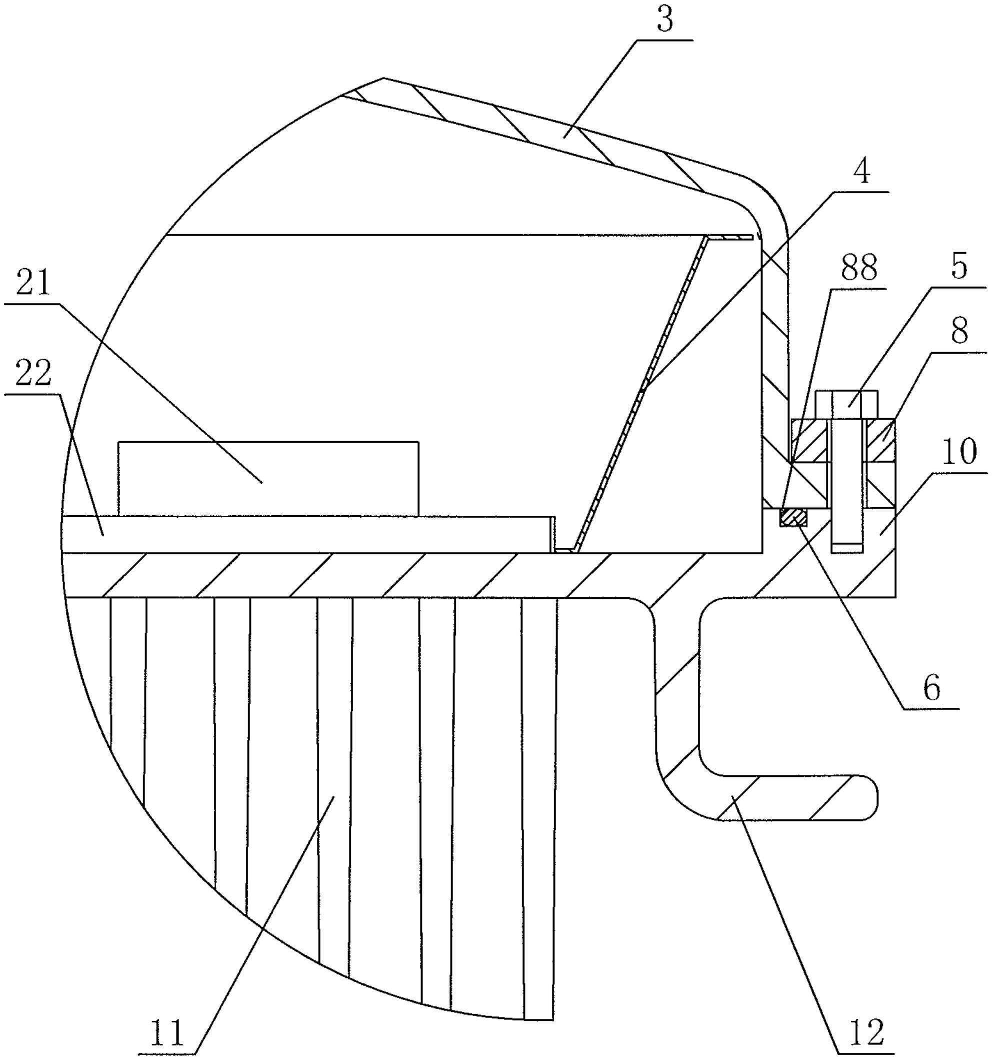
FIG. 7 is the partially magnified structural view of FIG. 5 showing the LED lamp II.

FIG. 2~FIG. 7 show an LED lamp of this preferred embodiment comprising an LED illuminant subassembly 2, a light transmission protective cover 3, a glisten cover 4, a drive subassembly 7, a power protective casing 9, and a lamp heat dissipation apparatus. The LED illuminant subassembly 2 includes several LEDs 21 and a heat dissipation circuit board 22. The lamp heat dissipation apparatus includes a heat dissipation substrate 1. The LED illuminant subassembly 2 and the heat dissipation substrate 1 are connected to conduct heat to the heat dissipation substrate 1 via the heat dissipation circuit board 22. The light transmission protective cover 3 and the heat dissipation substrate 1 are sealably connected.

The back of the heat dissipation substrate 1 is disposed with six hundred and eighty five heat dissipation rods and two handle shape lamp install boards 12. Spacings between each adjacent two heat dissipation rods 11 are the same. The heat to dissipation rods 11 are in a whole array in a shape of a diamond. Namely, the heat dissipation rods 11 could be looked upon as a diamond element of a continuous array, with each heat dissipation rod 11 having a center. The most adjacent six of heat dissipation rods 11 could be looked upon as an array in a beehive shape. With the heat dissipation rods 11 in total being twenty eight rows, fourteen of the rows have twenty four rods 11, and the other fourteen rows have twenty three rods 11. The thickness of the heat dissipation substrate 1 is 5 mm, the diameter of the heat dissipation rods 11 is ϕ5 mm, the height of the heat dissipation rods 11 is 60 mm, and the distance between centers of each two adjacent heat dissipation rods 11 is d1=11.5 mm.

A circumference of the heat dissipation substrate 1 is disposed with a ring-type protuberance 10, with the ring-type protuberance 10 disposed with a ring-type slot 88 containing a sealing strip 6 sealably connected with the light transmission protective cover 3. The light transmission protective cover 3 is connected with the ring-type protuberance 10 of the heat dissipation substrate 1 via several bolts 5. A decorative press loop 8 is disposed between the several bolts 5 with the light transmission protective cover 3. The LED lamp comprises a glisten cover 4 disposed in the sealable space of the light transmission protective cover 3 and the heat dissipation substrate 1. The light transmission protective cover 3 is made of glass or plastic. The heat dissipation substrate 1 is made of aluminium, aluminium alloy, copper or copper alloy. The heat dissipation rods 11 and the heat dissipation substrate are made integrally.

The LED lamp comprises a drive subassembly 7 comprising a constant voltage device 71 and a heat dissipation drive circuit board 72. The drive subassembly 7 is located in the sealable space formed by the light transmission protective cover 3 and the heat dissipation substrate 1. The heat dissipation drive circuit board 72 and the heat dissipation substrate 1 are connected to conduct heat. The LED lamp comprises a power protective casing 9 connected to the heat dissipation substrate 1 via a bolt 13. The power protective casing 9 is sealably contained in the sealing ring 61 of a bottom of the heat dissipation substrate 1. The power protective casing 9 contains a power switch subassembly 91, with an input power cable of the power switch subassembly 91 going through the power protective casing 9 via a sealable cable block 92 and sealed. The heat dissipation substrate 1 is disposed with a ring-type protuberance with a cable orifice 17. An output power cable of the power switch subassembly 91 goes through the cable orifice 17 of the ring-type protuberance and is connected with the constant voltage device 71. An output power cable of the power switch subassembly 91 is disposed with an anti-water sealable glue 18. The LED lamp of this preferred embodiment, guaranteed with the sealing waterproofing function of the power protective casing 9 and the sealable space of the light transmission protective cover 3 and the heat dissipation substrate 1, could be used outdoors.

As the back of the heat dissipation substrate 1 is disposed with several heat dissipation rods 11, the heat dissipation area of the heat dissipation rods 11 is bigger than the traditional's heat dissipation area. The interspaces of the heat dissipation rods 11 crisscross to allow air flow in any direction freely and not blocked in the interspaces of the heat dissipation rods 11. Namely, outside air will make good effect to the heat dissipation of the lamp. This is quite important to an outdoor street lamp, a wall washer lamp and a large lamp. After a contrast test in the same environment temperature, the same specification lamp without disposed heat dissipation patches and heat dissipation rods will only depend on heat dissipation, substrate heat dissipation, and the working balance temperature of the heat dissipation substrate will be above 100° C.; with disposed heat dissipation patches, the working balance temperature of the heat dissipation substrate will be above 70° C.; but with disposed heat dissipation rods, the working balance temperature of the heat dissipation substrate will under 60° C., and with the array working manner of this preferred embodiment including the heat dissipation rods, the working balance temperature will be lower than 50° C. So, this invention's lamp heat dissipation apparatus and LED lamp have a good heat dissipation effect.

After the test, the heat dissipation effect is the best under the following specification range: the thickness of the heat dissipation substrate is 3~8 mm, the diameter of the heat dissipation rods is ϕ2~ϕ8 mm, the height of the heat dissipation rods is 10~200 mm, and the distance between centers of each adjacent two heat dissipation rod is 5~18 mm.

Embodiment II

Figure 8:
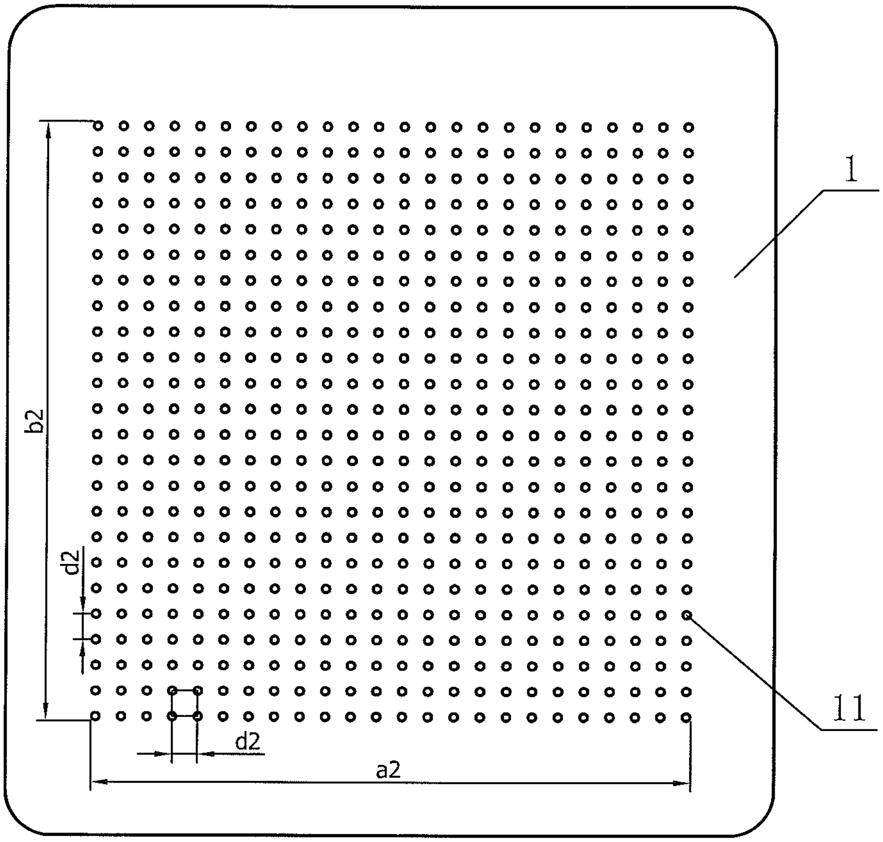
FIG. 8 is the structural view of a lamp heat dissipation apparatus of a second preferred embodiment of this invention.
Figure 9:
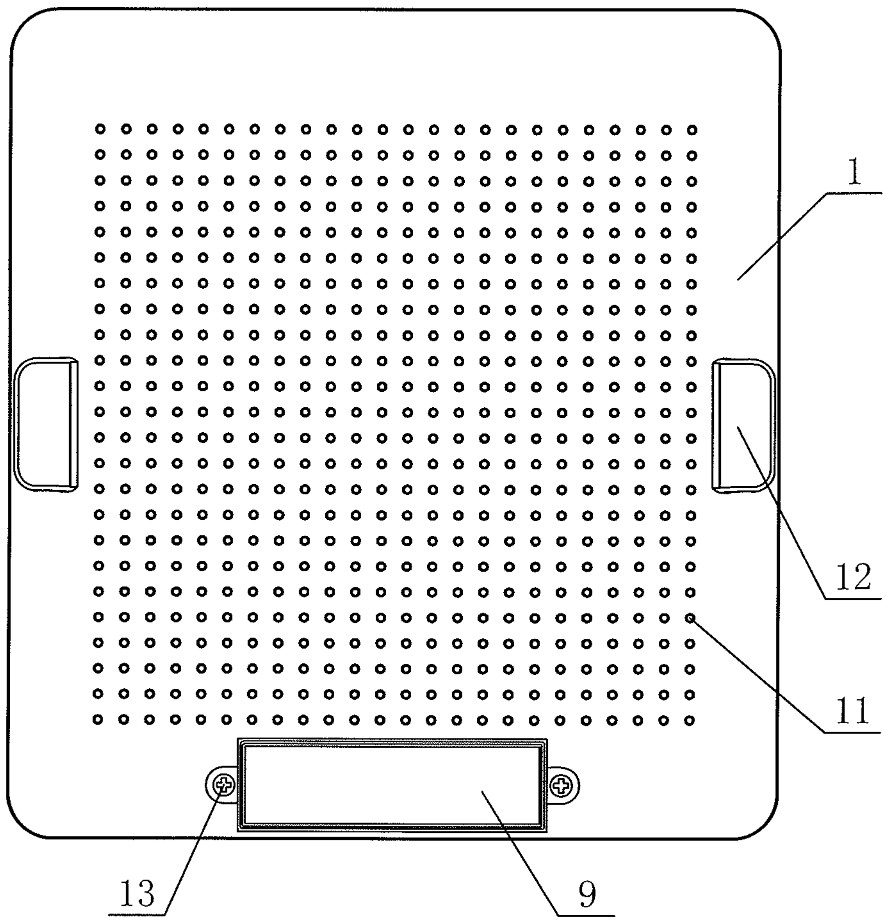
FIG. 9 is the rear structural view of an LED lamp of the second preferred embodiment of this invention.
Figure 10:
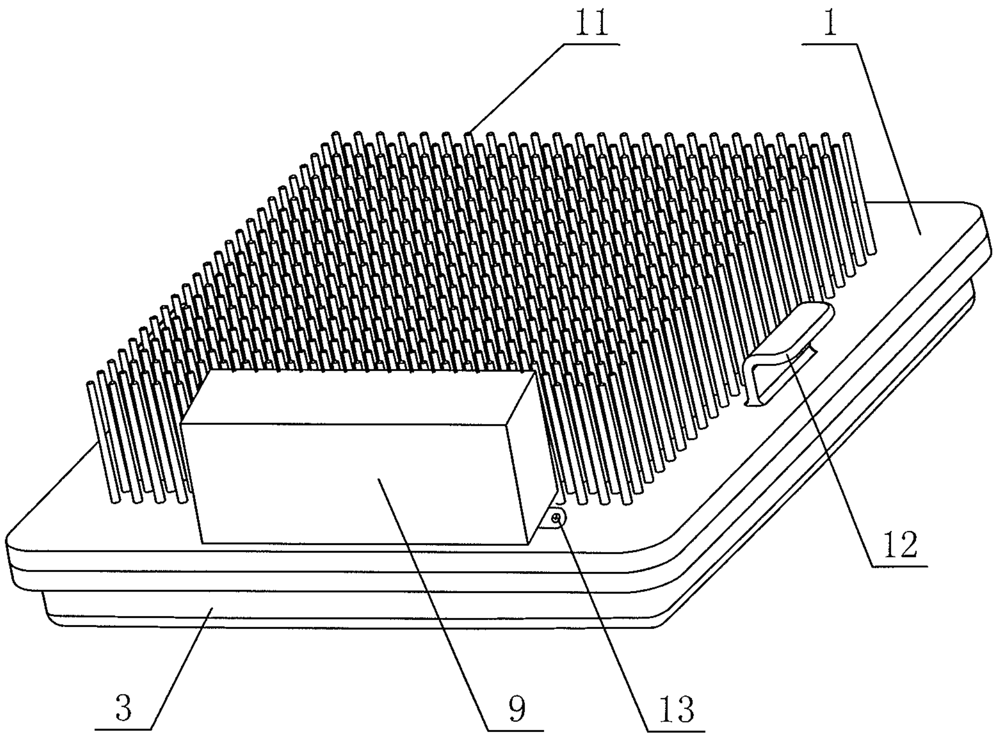
FIG. 10 is the exploded structural view of the LED lamp of the second preferred embodiment of this invention.

FIG. 8~FIG. 10 show differences between this preferred embodiment and the first preferred embodiment are the heat dissipation rods 11 are arranged in an array, the back of the heat dissipation substrate 1 is disposed in an array of five hundred and seventy six heat dissipation rods 11 in a 24×24 matrix, and the distance between centers of each adjacent two heat dissipation rods 11 is d2=11.5 mm, and the heat dissipation rods 11 could be looked upon as a square element in the form of a continuous array.

The other features of this preferred embodiment are the same with the first preferred embodiment.

Compare the heat dissipation area of the first preferred embodiment and the second preferred embodiment: in the first preferred embodiment, the heat dissipation rods 11 take up S1=a1×b1=269.5×273.9=73816 mm2 of the heat dissipation substrate area 1, the total of the heat dissipation rods 11 is N1=24×14=23×14=658, and its heat dissipation ratio is k1=N1/S1=0.008914/mm2=8914/m2; whereas in the second preferred embodiment, the heat dissipation rods 11 take up S2=a2×b2=269.5×269.5=72630 mm2 of the heat dissipation substrate area 1, the total of the heat dissipation rods 11 is N2=24×24=576, and its heat dissipation ratio is k2=N2/

S2=0.007931/mm2=7931/m2. From a ratio of two ratios k1/k2=1.12, under the same situation of the other specifications and adapting the heat dissipation array of the first preferred embodiment than the second preferred embodiment, the heat dissipation area could be added by 12%. Therefore, the heat dissipation effect of the first preferred embodiment is better.

This invention could be widely used in the lamp field.

The invention claimed is:

1. An LED lamp comprising: an LED illuminant subassembly; a light transmission protective cover; a heat dissipation substrate having a front and a back opposite to the front; several heat dissipation rods extending from the back of the heat dissipation substrate, with the LED illuminant subassembly comprising a plurality of LEDs and a heat dissipation circuit board separately formed from the heat dissipation substrate, with the LED illuminant subassembly connected to the front of the heat dissipation substrate to conduct heat to several heat dissipation rods disposed on the back of the heat dissipation substrate via the heat dissipation circuit board, with the light transmission protective cover and the heat dissipation substrate sealably connected to form a sealable space covering the LED illuminant subassembly, with the heat dissipation circuit board located intermediate the plurality of LEDs and the heat dissipation substrate, with the plurality of LEDs being opposite to the several heat dissipation rods; a drive subassembly comprising a constant voltage device and a heat dissipation drive circuit board, with the drive subassembly located in the sealable space formed by the light transmission protective cover and the heat dissipation substrate, with the heat dissipation drive circuit board and the heat dissipation substrate connected to conduct heat; and a power protective casing connected to the heat dissipation substrate via a bolt, with the power protective casing sealably contained in a sealing ring of a bottom of the heat dissipation substrate, with the power protective casing containing a power switch subassembly, with an input power cable of the power switch subassembly going through the power protective casing via a sealable cable block and sealed, with the heat dissipation substrate disposed with a ring-type protuberance with a cable orifice, with an output power cable of the power switch subassembly going through the cable orifice of the ring-type protuberance and connected with the constant voltage device, and with the output power cable of the power switch subassembly disposed with a waterproofing sealant.

2. The LED lamp as claimed in claim 1, wherein an outside circumference of the heat dissipation substrate is disposed with a ring-type protuberance, with the ring-type protuberance disposed with a ring groove containing a sealing strip sealably connected with the light transmission protective cover, with the several heat dissipation rods located within the outside circumference.

3. The LED lamp as claimed in claim 2, wherein the light transmission protective cover is connected with the ring-type protuberance of the heat dissipation substrate via several bolts, wherein a pressure ring is disposed between the several bolts with the light transmission protective cover.

4. The LED lamp as claimed in claim 1, wherein the back of the heat dissipation substrate is disposed with a lamp install board.

5. The LED lamp as claimed in claim 1, further comprising a glisten cover disposed in the sealable space of the light transmission protective cover and the heat dissipation substrate.

6. The LED lamp as claimed in claim 1, wherein the light transmission protective cover is made of glass or plastic, the heat dissipation substrate is made of aluminium, aluminium alloy, copper, or copper alloy, and the heat dissipation rods and the heat dissipation substrate are integral.

* * * * *